US011336326B2

(12) United States Patent
Chen et al.

(10) Patent No.: US 11,336,326 B2
(45) Date of Patent: May 17, 2022

(54) COMMUNICATION METHOD AND APPARATUS WITH REDUCED POWER CONSUMPTION IN A MULTI-ANTENNA ENVIRONMENT

(71) Applicant: HUAWEI TECHNOLOGIES CO., LTD., Shenzhen (CN)

(72) Inventors: Shuai Chen, Shanghai (CN); Wei Chen, Shanghai (CN); Xiaojun Zheng, Shanghai (CN); Tao Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/939,315

(22) Filed: Jul. 27, 2020

(65) Prior Publication Data

US 2020/0358473 A1 Nov. 12, 2020

Related U.S. Application Data

(63) Continuation of application No. PCT/CN2019/073228, filed on Jan. 25, 2019.

(30) Foreign Application Priority Data

Jan. 31, 2018 (CN) .......................... 201810100070.2

(51) Int. Cl.
H04B 1/58 (2006.01)
H04B 7/04 (2017.01)
H04W 52/02 (2009.01)

(52) U.S. Cl.
CPC ............... H04B 1/583 (2013.01); H04B 7/04 (2013.01); H04W 52/0206 (2013.01)

(58) Field of Classification Search
CPC .... H04B 7/0617; H04B 1/525; H04B 7/0413; H04B 17/12; H04B 1/0475; H04B 7/086;
(Continued)

(56) References Cited

U.S. PATENT DOCUMENTS 9,628,256 B2    4/2017  O'Keeffe et al.
9,948,408 B1 *  4/2018  Gomadam ............... H04B 7/04
(Continued)

FOREIGN PATENT DOCUMENTS

CN    201378631 Y    1/2010
CN    103477570 A    12/2013
(Continued)

Primary Examiner — Golam Sorowar
(74) Attorney, Agent, or Firm — Rimon PC

(57) ABSTRACT

A communications apparatus includes a phase correction unit, a first radio frequency channel, a first analog bridge, a second radio frequency channel, and a second analog bridge. A first signal is sent to a first input end using the first radio frequency channel, and is divided into at least two channels of first sub-signals by using the first analog bridge. The at least two channels of first sub-signals are respective output from at least two first output ends to at least two first antenna arrays. Similarly, a second signal is divided into at least two channels of second sub-signals by using the second analog bridge, and the at least two channels of second sub-signals are output to at least two second antenna arrays. A first channel of first sub-signal and a first channel of second sub-signal are coupled to the phase correction unit by using a coupler.

10 Claims, 7 Drawing Sheets

(58) Field of Classification Search
CPC . H04B 17/21; H04B 1/10; H04B 1/40; H04B 2001/0408; H04B 17/14; H04B 7/0408; H04B 7/0452; H04B 7/04; H04B 7/0417; H04B 7/08; H04B 15/00; H04B 17/11; H04B 1/0057; H04B 1/401; H04L 5/14; H04L 5/1461; H04L 5/143; H04L 25/0212; H04L 25/025; H04L 27/0002; H04L 27/34; H04L 25/0202; H04L 25/0204; H04L 25/0224; H04L 27/2003; H04L 27/2691; H04L 5/0007; H04L 5/0023; H04L 5/08; H04L 5/16; H04L 67/12; H04L 7/0016; H04L 7/0331; H04L 1/006; H01Q 3/267; H01Q 1/246; H01Q 3/36; H01Q 3/38; H01Q 3/34; H01Q 21/0025; H01Q 3/2605; H01Q 1/243; H01Q 21/065; H01Q 3/28; H01Q 3/40; H01Q 21/0006; H01Q 25/00; H01Q 21/061; H01Q 21/22; H01Q 21/24; H01Q 3/26; H01Q 3/2617; H01Q 3/42; H01Q 1/2283; H04W 16/28; H04W 72/0453; H04W 72/046; H04W 88/085; H04W 24/08; H04W 72/082; H04W 88/08; H04W 24/02; H04W 40/06; H04W 4/025; H04W 4/33; H04W 4/70; H04W 52/0206; H04W 52/0209; H04W 52/0229; H04W 52/0245; H04W 52/028; H04W 52/146; H04W 52/223; H04W 52/242

See application file for complete search history.

(56) References Cited

U.S. PATENT DOCUMENTS

| | | |
|---|---|---|
| 2006/0208944 A1 | 9/2006 | Haskell |
| 2012/0163428 A1 | 6/2012 | Shin et al. |
| 2013/0188753 A1 | 7/2013 | Tarlazzi et al. |
| 2014/0204902 A1* | 7/2014 | Maltsev ............ H04W 36/0083 370/331 |
| 2015/0146583 A1* | 5/2015 | Yoon ........................ H04B 1/18 370/278 |
| 2015/0200435 A1 | 7/2015 | Guimaraes |
| 2017/0062897 A1 | 3/2017 | Chance et al. |
| 2018/0019524 A1* | 1/2018 | Matsuki ............... G01S 13/4463 |

FOREIGN PATENT DOCUMENTS

| | | |
|---|---|---|
| CN | 105098383 A | 11/2015 |
| CN | 105139047 A | 12/2015 |
| CN | 206040984 U | 3/2017 |
| CN | 106602265 A | 4/2017 |
| CN | 106936450 A | 7/2017 |
| EP | 1583174 A2 | 10/2005 |
| KR | 20130134731 A | 12/2013 |

* cited by examiner

COMMUNICATION METHOD AND APPARATUS WITH REDUCED POWER CONSUMPTION IN A MULTI-ANTENNA ENVIRONMENT

CROSS-REFERENCE TO RELATED APPLICATIONS

This application is a continuation of International Application No. PCT/CN2019/073228, filed on Jan. 25, 2019, which claims priority to Chinese Patent Application No. 201810100070.2, filed on Jan. 31, 2018. The disclosures of the aforementioned applications are hereby incorporated by reference in their entireties.

TECHNICAL FIELD

The present invention relates to the field of communications technologies, and in particular, to a multi-antenna technology.

BACKGROUND

With continuous development of a long term evolution (LTE) network and a 5th generation (5G) network, a multi-antenna technology is proposed, for example, a multiple input multiple output (MIMO) technology. A system capacity can be effectively increased by using the multi-antenna technology. For downlink multiple-output, a plurality of transmit channels and antenna arrays on a base station side may be used for beamforming, so that transmitted signals are separately directed to different terminal users, thereby increasing a downlink capacity. For uplink multiple-input, demodulation sensitivity of a base station is increased, thereby increasing an uplink capacity. Alternatively, beamforming may be performed on a received uplink beam based on signals transmitted by a terminal, so that signals only from the direction in which the terminal transmits the signals are received, and interference from other surrounding signals is suppressed, thereby further increasing the uplink system capacity.

In the multi-antenna technology, when the system capacity is increased, power consumption of an operator is also increased. How to reduce system power consumption when the multi-antenna technology is used is a problem urgently needed to be resolved.

SUMMARY

Embodiments of this application provide a communications apparatus that uses a multi-antenna technology to reduce system power consumption.

According to a first aspect, an embodiment of the present invention provides a communications apparatus, including a phase correction unit, a first radio frequency channel, a first analog bridge, a second radio frequency channel, and a second analog bridge. The first analog bridge includes a first input end and at least two first output ends, the first input end is connected to the first radio frequency channel, and each first output end is connected to one first antenna array. A connection relationship between the first output end and the first antenna array may be a direct connection or an indirect connection. The indirect connection means that another component is disposed between the first output end and the first antenna array, and the first output end is connected to the first antenna array by using the other component. There is a one-to-one correspondence between the first output end and the first antenna array, and different first output ends are correspondingly connected to different first antenna arrays. The second analog bridge includes a second input end and at least two second output ends, the second input end is connected to the second radio frequency channel, and each second output end is connected to one second antenna array. A connection manner between the second output end and the second array antenna may be the same as a connection manner between the first output end and the first antenna array.

A first signal is sent to the first input end by using the first radio frequency channel, and is divided into at least two channels of first sub-signals by using the first analog bridge, and the at least two channels of first sub-signals are separately output from the at least two first output ends to at least two first antenna arrays. A second signal is sent to the second input end by using the second radio frequency channel, and is divided into at least two channels of second sub-signals by using the second analog bridge, and the at least two channels of second sub-signals are separately output from the at least two second output ends to at least two second antenna arrays. A first channel of first sub-signal in the at least two channels of first sub-signals and a first channel of second sub-signal in the at least two channels of second sub-signals are coupled to the phase correction unit by using a coupler, and the phase correction unit sends an adjusted signal to a corresponding radio frequency channel, so that a phase of the first channel of first sub-signal is the same as a phase of the first channel of second sub-signal.

In this application, by using the first analog bridge and the second analog bridge, signals of the first radio frequency channel and signals of the second radio frequency channel are divided into at least two first sub-signals and at least two second sub-signals respectively after passing through the first analog bridge and the second analog bridge respectively. In addition, the phase correction unit is used to adjust a phase of a signal, so that the at least two first sub-signals respectively drive the at least two first antenna arrays, and the at least two second sub-signals respectively drive the at least two second antenna arrays. In this way, a signal of a radio frequency channel may be divided into at least two channels of signals and can drive at least two antenna arrays. Therefore, in the communications apparatus provided in this application, a ratio of a quantity of radio frequency channels to a quantity of correspondingly covered antenna arrays is 1:N, where N is greater than or equal to 2, so that more antenna arrays can be covered with a small quantity of radio frequency channels. A small quantity of radio frequency channels indicates low power consumption, thereby saving energy. In an implementation, the communications apparatus is an RRU, and the first antenna arrays and the second antenna arrays are not included in the communications apparatus.

In an implementation, the communications apparatus further includes an antenna unit, and the antenna unit includes the at least two first antenna arrays and the at least two second antenna arrays. This embodiment specifically protects the communications apparatus including the RRU and the antennas. That is, in addition to the phase correction unit, the first radio frequency channel, the first analog bridge, the second radio frequency channel, and the second analog bridge, the communications apparatus further includes the first antenna arrays and the second antenna arrays.

According to a second aspect, a communications apparatus provided in an embodiment of this application includes an antenna unit, a first analog bridge, and a second analog bridge. The antenna unit includes at least two first antenna arrays and at least two second antenna arrays. The first analog bridge includes a first input end and at least two first output ends, the first input end is connected to a first radio frequency channel, and each first output end is connected to one first antenna array. The second analog bridge includes a second input end and at least two second output ends, the second input end is connected to a second radio frequency channel, and each second output end is connected to one second antenna array.

A first signal is sent to the first input end by using the first radio frequency channel, and is divided into at least two channels of first sub-signals by using the first analog bridge, and the at least two channels of first sub-signals are separately output from the at least two first output ends to the at least two first antenna arrays. A second signal is sent to the second input end by using the second radio frequency channel, and is divided into at least two channels of second sub-signals by using the second analog bridge, and the at least two channels of second sub-signals are separately output from the at least two second output ends to the at least two second antenna arrays. A first channel of first sub-signal in the at least two channels of first sub-signals and a first channel of second sub-signal in the at least two channels of second sub-signals are coupled to the phase correction unit by using a coupler, and the phase correction unit sends an adjusted signal to a corresponding radio frequency channel, so that a phase of the first channel of first sub-signal is the same as a phase of the first channel of second sub-signal.

Specifically, the communications apparatus in this implementation is an antenna system, does not include the first radio frequency channel and the second radio frequency channel, and includes only the antenna unit, the first analog bridge, and the second analog bridge. The first signal at an input end of the first analog bridge in the antenna system may be divided into the at least two channels of first sub-signals. In this way, one channel of input signal may be transmitted to at least two antenna arrays, thereby saving energy.

In an implementation, that the phase correction unit sends an adjusted signal to a corresponding radio frequency channel includes:
adjusting, by the phase correction unit, the first signal, and sending an adjusted first signal to the first radio frequency channel; or adjusting, by the phase correction unit, the second signal, and sending an adjusted second signal to the second radio frequency channel; or adjusting, by the phase correction unit, the first signal and the second signal, sending an adjusted first signal to the first radio frequency channel, and sending an adjusted second signal to the second radio frequency channel. The foregoing implementation includes three specific embodiments. In a first embodiment, the phase correction unit adjusts the first signal, and sends the adjusted signal to the first radio frequency channel, and whether the phase correction unit adjusts the second signal is not limited. In a second embodiment, the phase correction unit adjusts the second signal, and sends the adjusted signal to the second radio frequency channel, and whether the phase correction unit adjusts the first signal is not limited. In a third embodiment, the phase correction unit adjusts both the first signal and the second signal, and sends the adjusted signals to the first radio frequency channel and the second radio frequency channel. This implementation defines a specific manner in which the phase correction unit performs phase correction on a signal.

In an implementation, the phase correction unit periodically performs phase adjustment on the first signal and the second signal, and periodically sends an adjusted signal to a corresponding radio frequency channel. Periodic adjustment means that the phase correction unit adjusts a phase at an interval of a preset time each time, to form an adjustment period. Setting of the adjustment period may be affected by a factor of an environment in which the communications apparatus is located, such as a temperature, humidity, and a geographical location. The adjustment period is set before the communications apparatus is delivered from a factory. The communications apparatus is applied to a communications device. The communications device may be provided with a timing unit. The timing unit may be hardware, for example, a timer chip, or may be implemented by using software. The timing unit is configured to: set the adjustment period, and transmit an adjustment period signal to the phase correction unit. In this implementation, a phase is periodically adjusted, so that the communications apparatus is more energy-saving.

In an implementation, a phase difference between the first channel of first sub-signal and a second channel of first sub-signal in the at least two channels of first sub-signals is a first preset value, and a phase difference between the first channel of second sub-signal and a second channel of second sub-signal in the at least two channels of second sub-signals is a second preset value.

Specifically, one of the at least two first output ends is a first port, and another of the at least two first output ends is a second port. The first channel of first sub-signal is output from the first port, and the second channel of first sub-signal is output from the second port. The first port is connected to a first channel of first phase shifter, and the first channel of first phase shifter is configured to adjust the first channel of first sub-signal, so that the phase difference between the first channel of first sub-signal and the second channel of first sub-signal reaches the first preset value; and/or the second port is connected to a second channel of first phase shifter, and the second channel of first phase shifter is configured to adjust the second channel of first sub-signal, so that the phase difference between the first channel of first sub-signal and the second channel of first sub-signal reaches the first preset value. In summary, a phase shifter may be disposed at each of the first port and the second port, or a phase shifter may be disposed at only one of the ports.

Similarly, one of the at least two second output ends is a third port, and another of the at least two second output ends is a fourth port. The first channel of second sub-signal is output from the third port, and the second channel of second sub-signal is output from the fourth port. The third port is connected to a first channel of second phase shifter, and the first channel of second phase shifter is configured to adjust the first channel of second sub-signal, so that the phase difference between the first channel of second sub-signal and the second channel of second sub-signal reaches the first preset value; and/or the fourth port is connected to a second channel of second phase shifter, and the second channel of second phase shifter is configured to adjust the second channel of second sub-signal, so that the phase difference between the first channel of second sub-signal and the second channel of second sub-signal reaches the second preset value. In summary, a phase shifter may be disposed at each of the third port and the fourth port, or a phase shifter may be disposed at only one of the ports.

Specifically, by using expected phase differences (that is, the first preset value and the second preset value), vertical directions of beams combined by antenna arrays corresponding to all radio frequency channels are the same as those before the radio frequency channels are disabled, so that a cell is not changed. The cell is not changed, so that a handover or re-access of UE is avoided, thereby ensuring user experience.

The first preset value and/or the second preset value may be 90 degrees. The phase difference is formed between the first sub-signals, so that radiation performance of the antennas can be ensured.

In an implementation, the first preset value is the same as the second preset value. In other words, a phase difference between the first sub-signals and a phase difference between the second sub-signals are consistent and are the same preset value, favorable to regularity and stability of covering a signal by an antenna array of the communications apparatus.

The first phase shifter and the second phase shifter may be fixed phase shifters or tunable phase shifters, and may be separate electronic components, or may be integrated with another element, for example, may be a phase shift unit integrated in a coupler. However, adjusting the phase difference is not limited to using the phase shifter. This embodiment of this application may alternatively be implemented in another manner. For example, output ports of analog bridges may have a phase difference, that is, a phase difference between at least one first output end and at least one second output end is implemented by using a circuit architecture in the bridges.

In an implementation, the first input end is connected to a first power amplifier, and the first power amplifier is configured to amplify the first signal. The second input end is connected to a second power amplifier, and the second power amplifier is configured to amplify the second signal. The first power amplifier may be disposed in the first radio frequency channel, or may be disposed between the first radio frequency channel and the first analog bridge. Similarly, the second input end may also be provided with a power amplifier. A power amplifier is configured to amplify power of a radio frequency signal, to improve strength of a signal radiated by the antenna array.

In an implementation, the first analog bridge and/or the second analog bridge are/is a single analog bridge or a group of analog bridges. This implementation includes three specific embodiments. In a first embodiment, the first analog bridge is a single analog bridge or a group of analog bridges. In a second embodiment, the second analog bridge is a single analog bridge or a group of analog bridges. In a third embodiment, each of the first analog bridge and the second analog bridge is a single analog bridge or a group of analog bridges.

For ease of understanding, in a specific implementation, there are two first output ends, and the two first output ends are respectively a first port and a second port. There are two second output ends, and the two second output ends are respectively a third port and a fourth port. After the phase correction unit sends the adjusted signals to the corresponding radio frequency channels, where the corresponding radio frequency channels are the first radio frequency channel and the second radio frequency channel, a phase of the first sub-signal of the first port is the same as a phase of the second sub-signal of the third port. This embodiment provides a design of the first analog bridge and the second analog bridge that divide one signal into two channels of signals. That is, each radio frequency channel correspondingly drives two antenna arrays. The Signal is processed more easily, and it is also easier for the phase correction unit to select a signal for correction. The phase correction unit may refer to a signal coupled back by the first port and the third port, or the phase correction unit may refer to a signal coupled back by the second port and the fourth port. The first port, the second port, the third port, and the fourth port are all connected to the phase correction unit, and the phase correction unit selects two channels of signals for adjustment based on a requirement. The phase correction unit is electrically connected to the first radio frequency channel and the second radio frequency channel, and is configured to transmit the adjusted signals to the first radio frequency channel and the second radio frequency channel.

In an implementation, a phase of the first sub-signal of the second port is the same as a phase of the second sub-signal of the fourth port.

In an implementation, the communications apparatus has at least two radio frequency channels, and there are also at least two input ends of the first analog bridge and the second analog bridge, thereby forming a one-to-one driving relationship between a plurality of radio frequency channels and a plurality of antenna arrays. Specifically, when quantities of the first input ends, the first radio frequency channels, and the first output ends are all N, where N is greater than or equal to 2, and all the first radio frequency channels are enabled, the first radio frequency channels, the first input ends, and the first output ends are connected in a one-to-one correspondence, thereby forming N parallel first signal branches.

Correspondingly, when quantities of the second input ends, the second radio frequency channels, and the second output ends are all N, where N is greater than or equal to 2, and all the second radio frequency channels are enabled, the second radio frequency channels, the second input ends, and the second output ends are connected in a one-to-one correspondence, thereby forming N parallel second signal branches.

Specifically, the communications apparatus further includes a signal processing unit. When all the first radio frequency channels are enabled, the signal processing unit performs pre-weighting processing on signals of all the first radio frequency channels, so that the signals of the N first radio frequency channels are respectively transmitted from the N parallel first signal branches to different antenna arrays. When all the second radio frequency channels are enabled, the signal processing unit performs pre-weighting processing on signals of all the second radio frequency channels, so that the signals of the N second radio frequency channels are respectively transmitted from the N parallel second signal branches to different antenna arrays.

The signal processing unit performs pre-weighting processing on the signals of the first radio frequency channels by using an inverse compensation bridge, and the inverse compensation bridge is an inverse matrix of the first analog bridge. For example, in an implementation, an algorithm of the inverse compensation bridge is as follows:

A mapping array of a signal of the first analog bridge is:

$$\frac{1}{\sqrt{2}}\begin{bmatrix} 1 & -j \\ -j & 1 \end{bmatrix},$$

where j is a complex number.

Before being pre-weighted by using the inverse compensation bridge, one channel of signal in output signals of the first analog bridge is represented as:

$$\begin{bmatrix} X^0 \\ X^1 \end{bmatrix}.$$

A matrix of a signal of the inverse compensation bridge is an inverse matrix of the first analog bridge 40:

$$\begin{bmatrix} \frac{1}{\sqrt{2}} & \frac{j}{\sqrt{2}} \\ \frac{j}{\sqrt{2}} & \frac{1}{\sqrt{2}} \end{bmatrix}$$

After being pre-weighted by using the inverse compensation bridge, an input signal of the first radio frequency channel, that is, an input signal corresponding to the one channel of output signal of the first analog bridge, is:

$$\begin{bmatrix} Y^0 \\ Y^1 \end{bmatrix} = \frac{1}{\sqrt{2}} \begin{bmatrix} 1 & -j \\ -j & 1 \end{bmatrix} \begin{bmatrix} \frac{1}{\sqrt{2}} & \frac{j}{\sqrt{2}} \\ \frac{j}{\sqrt{2}} & \frac{1}{\sqrt{2}} \end{bmatrix} \begin{bmatrix} X^0 \\ X^1 \end{bmatrix}$$

$$= \begin{bmatrix} X^0 \\ X^1 \end{bmatrix}.$$

It can be learned that, after being pre-weighted by using the inverse compensation bridge, the signal input by the radio frequency channel in each signal branch is consistent with the signal output by the analog bridge.

BRIEF DESCRIPTION OF DRAWINGS

To describe the technical solutions in embodiments of the present invention or in the background more clearly, the following describes the accompanying drawings required for describing the embodiments of the present invention or the background.

FIG. 3b is an enlarged schematic diagram of an antenna array in FIG. 3a;

DESCRIPTION OF EMBODIMENTS

The following describes embodiments of the present invention with reference to the accompanying drawings in the embodiments of the present invention.

Figure 1:
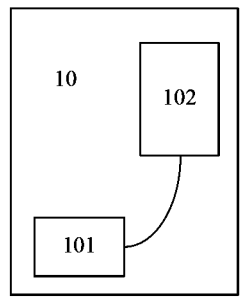
FIG. 1 is a schematic diagram of a system according to an implementation of this application.

The technical solutions in the embodiments of this application is applicable to a system 10 shown in FIG. 1. The system includes a radio frequency apparatus 101 and an antenna apparatus 102. The radio frequency apparatus 101 is connected to the antenna apparatus 102.

The radio frequency apparatus 101 may be configured to: convert a received digital signal into a radio frequency signal, and send the radio frequency signal to the antenna apparatus 102; or receive a radio frequency signal from the antenna apparatus 102, convert the radio frequency signal into a digital signal, and send the digital signal to a baseband control unit. The antenna apparatus 102 may transmit a received radio frequency signal, or receive an external radio frequency signal and transmit the external radio frequency signal to the radio frequency apparatus 101.

The radio frequency apparatus 101 and the antenna apparatus 102 in FIG. 1 may be physically separated. For example, the radio frequency apparatus 101 may be a radio remote unit (RRU) or a radio frequency unit (RFU), and the antenna apparatus may be a plurality of antennas, where the plurality of antennas may be arranged in one radome. The radio frequency apparatus 101 and the antenna apparatus 102 may be physically integrated. For example, the system 10 may be an active antenna unit (AAU).

Figure 2:
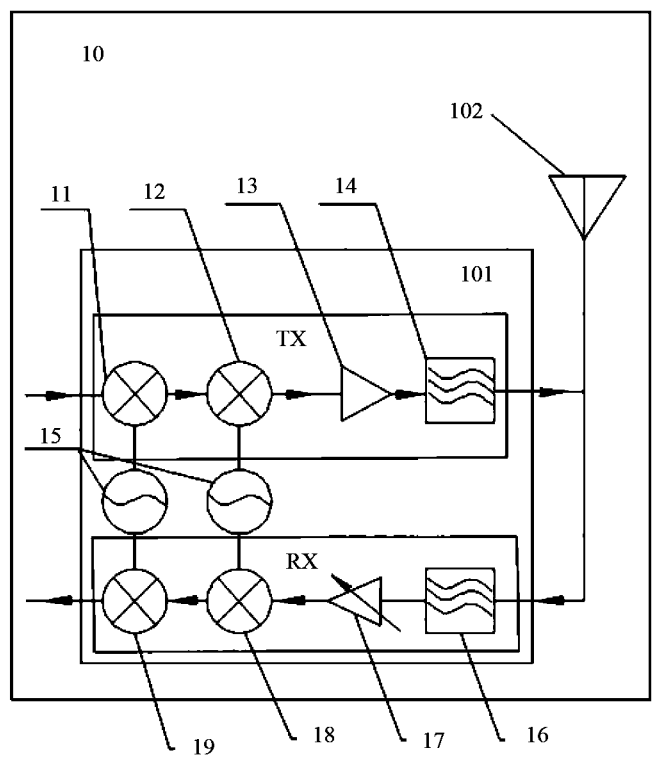
FIG. 2 is a schematic diagram of a system according to an implementation of this application.

FIG. 2 is a schematic diagram of a system 10 in an implementation, including a radio frequency apparatus 101 and an antenna apparatus 102. The radio frequency apparatus 101 may include a transceiver, and the transceiver may be a transmitter TX and a receiver RX. Referring to FIG. 2, in an implementation, the transmitter TX includes a modulator 11, an up-converter 12, a power amplifier 13, and a band-pass filter 14 that are electrically connected in sequence. Optionally, the modulator 11 and the up-converter 12 are each connected to one oscillator 15. After entering the radio frequency apparatus 101, a baseband signal sent by a baseband control unit successively passes through the modulator 11, the up-converter 12, the power amplifier 13, and the band-pass filter 14, and then is sent to the antenna apparatus 102. The receiver RX includes a band-pass filter 16, a low noise amplifier 17, a down-converter 18, and a demodulator 19 that are electrically connected in sequence. Optionally, the down-converter 18 and the demodulator 19 are each connected to one oscillator 15. As shown in FIG. 2, the modulator 11 and the demodulator 19 are connected to one oscillator 15, and the up-converter 12 and the down-converter 18 are connected to one oscillator 15. It should be noted that this is merely an example. The modulator 11 and the demodulator 19 may be connected to different oscillators, and the up-converter 12 and the down-converter 18 may be connected to different oscillators. This is not limited in an embodiment of this application. After entering the radio frequency apparatus 101, an antenna signal successively passes through the band-pass filter 16, the low noise amplifier 17, the down-converter 18, and the demodulator 19, and forms a baseband signal to be sent to the baseband control unit. It should be noted that FIG. 2 is merely an example of the radio frequency apparatus 101 and the antenna apparatus 102. In this embodiment of this application, electronic components in the radio frequency apparatus 101, a quantity of the electronic components, and a connection relationship between the electronic components are not limited thereto.

Figure 3A:
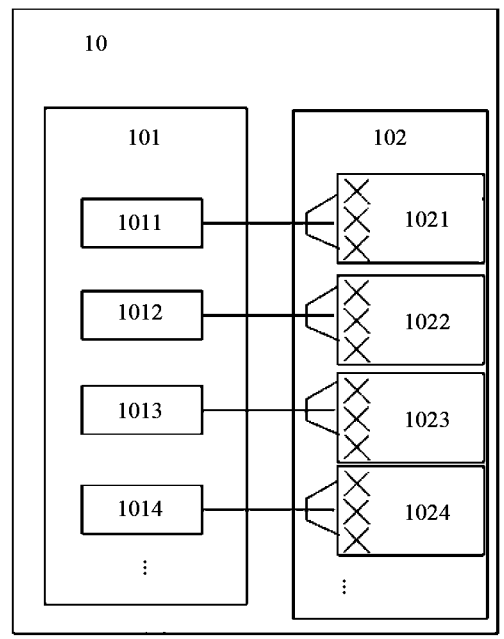
FIG. 3a is a schematic diagram of a system according to an implementation of this application.

FIG. 3a is a schematic diagram of a system 10 in an implementation. A radio frequency apparatus 101 may include a plurality of radio frequency channels, for example, radio frequency channels 1011, 1012, 1013, and 1014. The plurality of radio frequency channels may separately perform receiving and/or sending, to implement multiple-input multiple-output of the radio frequency apparatus. For example, a 2T2R radio frequency apparatus may include two radio frequency channels, and the two radio frequency channels may perform receiving and/or sending, to implement 2-input 2-output of the radio frequency apparatus. It should be noted that the radio frequency channel herein may be a circuit channel in the radio frequency apparatus, for example, a circuit channel in the transceiver shown in FIG. 2. For example, the circuit channel may include one or more electronic components in the circuit architecture shown in FIG. 2, and a plurality of radio frequency channels may share a circuit channel, or each radio frequency channel may include an independent circuit channel. Alternatively, the radio frequency channel herein may be a logical channel in the radio frequency apparatus, and conversion between a baseband signal and a radio frequency signal may be completed in the logical channel.

An antenna apparatus 102 may include a plurality of antenna arrays, for example, antenna arrays 1021, 1022, 1023, and 1024. One antenna array herein may be referred to as one antenna. Each radio frequency channel is connected to a corresponding antenna array. Each radio frequency channel may send a radio frequency signal to the corresponding antenna array, and the corresponding antenna array transmits the radio frequency signal to the air. For example, as shown in FIG. 3a, the radio frequency channel 1011 is connected to the antenna array 1021, and the radio frequency channel 1011 may send a radio frequency signal to the antenna array 1021. The radio frequency channel 1012 is connected to the antenna array 1022, and the radio frequency channel 1012 sends a radio frequency signal to the antenna array 1022. The radio frequency channel 1013 is connected to the antenna array 1023, and the radio frequency channel 1013 sends a radio frequency signal to the antenna array 1023. The radio frequency channel 1014 is connected to the antenna array 1024, and the radio frequency channel 1014 sends a radio frequency signal to the antenna array 1024.

Each antenna array includes one or more antenna elements. It should be noted that, that a radio frequency channel is connected to a corresponding antenna array may indicate that the radio frequency channel is connected to each antenna element in the antenna array. That the radio frequency channel sends a radio frequency signal to the corresponding antenna array may indicate that the radio frequency channel sends the radio frequency signal to each antenna element in the antenna array. That the radio frequency channel sends the radio frequency signal to the antenna array may be understood as that the radio frequency signal is sent to the antenna array by using the radio frequency channel, or may be represented as that the radio frequency channel drives the antenna array. One antenna array includes N (N is an integer greater than or equal to 1) antenna elements. In other words, one radio frequency channel drives N antenna elements, or 1-driving-N for short.

Figure 3B:
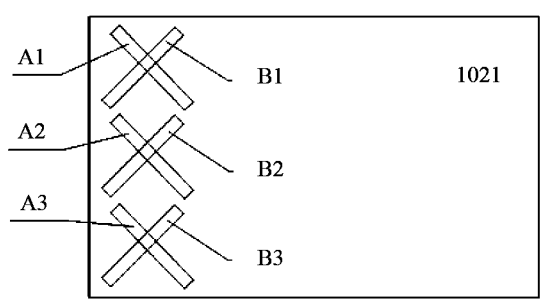

For example, with reference to FIG. 3a and FIG. 3b, the antenna array 1021 is used as an example for description. In FIG. 3b, an antenna element A1 and an antenna element B1 are arranged in a cross polarization direction of positive/negative 45 degrees. Similarly, an antenna element A2 and an antenna element B2 are arranged in a cross polarization direction of positive/negative 45 degrees, and an antenna element A3 and an antenna element B3 are also arranged in a cross polarization direction of positive/negative 45 degrees. The antenna elements A1, A2, and A3 jointly form an antenna array, and the antenna elements B1, B2, and B3 jointly form another antenna array. The two different antenna arrays may be driven by different radio frequency channels. The antenna array 1021 may be formed by the antenna elements A1, A2, and A3 jointly. The radio frequency channel 1011 is connected to the antenna array 1021, that is, the radio frequency channel 1011 is connected to the antenna element A1, the antenna element A2, and the antenna element A3. The antenna arrays 1022, 1023, and 1024 are similar to the antenna array 1021, and details are not described herein again.

As shown in FIG. 3a, the radio frequency channels are connected to the antenna arrays to form a one-to-one corresponding architecture. For example, the radio frequency channel 1011 corresponds to the antenna array 1021, and the radio frequency channel 1012 corresponds to the antenna array 1022. In the system 10, each radio frequency channel generates specific power consumption, and more radio frequency channels indicate higher power consumption of the system. When a relatively large user capacity is required, all or a plurality of radio frequency channels may be enabled. When a relatively small user capacity is required, still enabling all the or the plurality of radio frequency channels causes unnecessary power consumption. In this case, a method for reducing power consumption is needed. One solution is to choose to disable some radio frequency channels. However, because there is a one-to-one correspondence between a radio frequency channel and an antenna array, when some radio frequency channels are disabled, antenna arrays corresponding to some radio frequency channels are also disabled. A quantity of antenna arrays affects coverage performance of the system. When the system remains the same power, more antenna arrays indicate better system coverage. Conversely, fewer antenna arrays indicate poorer system coverage. Therefore, in this solution, the power consumption is reduced by disabling the radio frequency channels, but the coverage performance of the system is significantly degraded.

Based on the foregoing problem, an embodiment of this application provides a solution that can reduce power consumption. When a capacity requirement of the system 10 is relatively small, some radio frequency channels may be disabled, and a one-to-one correspondence between a radio frequency channel and an antenna array is changed, so that antenna arrays corresponding to some radio frequency channels are not disabled, thereby reducing system power consumption without significantly reducing coverage.

The following specifically describes the solution in this application.

Figure 4:
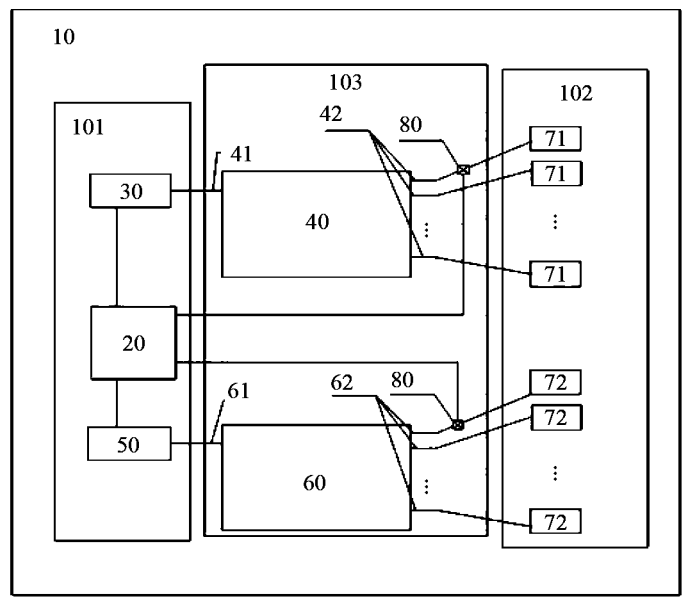
FIG. 4 is a schematic diagram of a system according to an implementation of this application.
Figure 5:
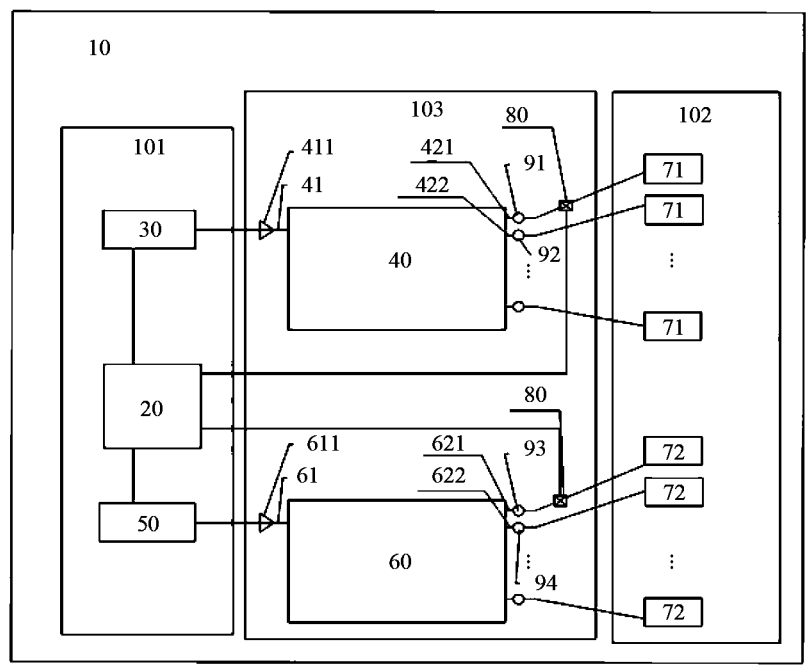
FIG. 5 is a schematic diagram of a system according to an implementation of this application.

FIG. 4 and FIG. 5 show a system 10 in an implementation provided in an embodiment of this application. A radio frequency apparatus 101 shown in FIG. 4 may implement a same or similar function of the radio frequency apparatus 101 in FIG. 2 and FIG. 3a. The radio frequency apparatus 101 shown in FIG. 4 includes a phase correction unit 20, a first radio frequency channel 30, and a second radio frequency channel 50. The first radio frequency channel 30 and the second radio frequency channel 50 may implement a same or similar function of the radio frequency channel 1011, 1012, 1013, or 1014 in FIG. 3a.

An antenna apparatus 102 shown in FIG. 4 may implement a same or similar function of the antenna apparatus 102 in FIG. 2 and FIG. 3a. The antenna apparatus 102 shown in FIG. 4 includes a plurality of first antenna arrays 71 and a plurality of second antenna arrays 72. The first antenna arrays 71 and the second antenna arrays 72 may implement a same or similar function of the antenna array 1021, 1022, 1023, or 1024 in FIG. 3a.

Different from FIG. 3a, in FIG. 4, there is not a one-to-one correspondence between a radio frequency channel and an antenna array. The system 10 shown in FIG. 4 further includes a bridge unit 103. The bridge unit 103 includes a first analog bridge 40 and a second analog bridge 60.

The first analog bridge 40 includes a first input end 41 and at least two first output ends 42. The first input end 41 is connected to the first radio frequency channel 30, and each first output end 42 is connected to one first antenna array 71. The first output ends 42 and the first antenna arrays 71 are in a one-to-one correspondence connection relationship, and different first output ends 42 are connected to different first antenna arrays 71, to form an antenna architecture in which a plurality of channels are parallel.

The second analog bridge 60 includes a second input end 61 and at least two second output ends 62. The second input end 62 is connected to the second radio frequency channel 50, and each second output end 62 is connected to one second antenna array 72. The second output ends 62 and the second antenna arrays 72 are in a one-to-one correspondence connection relationship, and different second output ends 62 are connected to different second antenna arrays 72, to form an antenna architecture in which a plurality of channels are parallel.

It should be noted that the first output end 42 may be directly or indirectly connected to the first antenna array 71. During an indirect connection, another component may be disposed between the first output end 42 and the first antenna array 71. The second output end 62 may be directly or indirectly connected to the second antenna array 72. During an indirect connection, another component may be disposed between the first output end 42 and the first antenna array 71.

In this implementation, a communications apparatus receives a first signal and a second signal from a signal source (for example, a baseband control unit). The first signal is sent to the first input end 41 by using the first radio frequency channel 30, and after entering the first analog bridge 40 through the first input end 41, the first signal is divided into at least two channels of first sub-signals by using the first analog bridge 40. The at least two channels of first sub-signals are respectively output from the at least two first output ends 42 to at least two first antenna arrays 71. The second signal is sent to the second input end 61 by using the second radio frequency channel 50, and after entering the second analog bridge 60 through the second input end 61, the second signal is divided into at least two channels of second sub-signals by using the second analog bridge 60. The at least two channels of second sub-signals are respectively output from the at least two second output ends 62 to at least two second antenna arrays 72.

A first channel of first sub-signal in the at least two channels of first sub-signals and a first channel of second sub-signal in the at least two channels of second sub-signals are coupled to the phase correction unit 20 by using couplers 80. One coupler 80 is located between a first output end corresponding to the first channel of first sub-signal and a first antenna array corresponding to the first channel of first sub-signal. The other coupler 80 is located between a second output end corresponding to the first channel of second sub-signal and a second antenna array corresponding to the first channel of second sub-signal. Herein, the first channel of first sub-signal may be any one of the at least two channels of first sub-signals. Similarly, the first channel of second sub-signal may be any one of the at least two channels of second sub-signals.

With reference to phases of the first channel of first sub-signal and the first channel of second sub-signal, the phase correction unit 20 adjusts a phase of a signal input into the radio frequency channel, and the phase correction unit 20 sends an adjusted signal to a corresponding radio frequency channel, so that a phase of the first channel of first sub-signal is the same as a phase of the first channel of second sub-signal.

By using the analog bridge and the phase correction unit, so that a signal of a radio frequency channel can be divided into at least two channels of signals and can drive at least two antenna arrays. Specifically, a ratio of a quantity of radio frequency channels to a quantity of corresponding covered antenna arrays is 1:N, where N is greater than or equal to 2. Therefore, a relatively large quantity of antenna arrays can be driven by using a relatively small quantity of radio frequency channels. By reducing the quantity of radio frequency channels without reducing the quantity of antenna arrays, the system power consumption is reduced and the coverage performance of the system is not significantly degraded.

In an implementation, that the phase correction unit 20 sends an adjusted signal to a corresponding radio frequency channel includes:
  adjusting, by the phase correction unit 20, the first signal, and sending an adjusted first signal to the first radio frequency channel 30; or
  adjusting, by the phase correction unit 20, the second signal, and sending an adjusted second signal to the second radio frequency channel 50; or
  adjusting, by the phase correction unit 20, the first signal and the second signal, sending an adjusted first signal to the first radio frequency channel 30, and sending an adjusted second signal to the second radio frequency channel 50, that is, adjusting, by the phase correction unit, both the first signal and the second signal, and sending adjusted signals to the first radio frequency channel 30 and the second radio frequency channel 50.

This implementation defines a specific manner in which the phase correction unit performs phase correction on a signal. The phase correction unit may be disposed based on different use environments or requirements, and correspondingly performs the foregoing corresponding correction manner, so that phase correction can be flexibly performed.

In an implementation, the phase correction unit 20 periodically performs phase adjustment on the first signal and the second signal, and sends adjusted signals to corresponding radio frequency channels. Periodic adjustment means that the phase correction unit adjusts a phase at an interval of a preset time each time, to form an adjustment period. Setting of the adjustment period may be affected by a factor of an environment in which the system 10 is located, such as a temperature, humidity, and a geographical location. In different environments such as different temperatures, different humidity, and different geographical locations, the system 10 may set different adjustment periods. Alternatively, the adjustment period may be fixed. For example, the adjustment period is set before the radio frequency apparatus 101 is delivered from a factory. The adjustment period may be implemented by setting a timing unit in the radio frequency apparatus 101. The timing unit may be hardware, for example, a timer chip, or the timing unit may be implemented by software. The timing unit is configured to: set the adjustment period, and transmit an adjustment period signal to the phase correction unit 20. In this implementation, periodical phase adjustment is used, on the one hand, excessively frequent phase correction is prevented, thereby saving resources; and on the other hand, a case in which after an excessively long time, a phase change of the first sub-signal or the second sub-signal causes a phase difference between the first channel of first sub-signal and the first channel of second sub-signal is avoided without affecting performance of the system 10, for example, coverage or a capacity.

In an implementation, a phase difference between the first channel of first sub-signal and a second channel of first sub-signal in the at least two channels of first sub-signals is a first preset value, and a phase difference between the first channel of second sub-signal and a second channel of second sub-signal in the at least two channels of second sub-signals is a second preset value.

The second channel of first sub-signal herein may be any channel of the at least two channels of first sub-signals except the first channel of first sub-signal. In other words, there may be a preset phase difference between each of the at least two channels of first sub-signals and the first channel of first sub-signal, and the preset phase difference between each of the at least two channels of first sub-signals and the first channel of first sub-signal may be the same or different. For example, a phase difference between the first channel of first sub-signal and each of other channels of first sub-signals is 90 degrees; or phase differences between the first channel of first sub-signal and other channel of first sub-signals are 90 degrees, 180 degrees, 270 degrees . . . . That a phase difference between the first channel of second sub-signal and the second channel of second sub-signal in the at least two channels of second sub-signals is a second preset value is similar to the foregoing description, and details are not described herein again.

The first preset value may be implemented by using the first analog bridge 40, and the second preset value may be implemented by using the second analog bridge 60. For example, the first analog bridge 40 is a 90-degree 2-input 2-output analog bridge. After the first signal passes through the first analog bridge, there is a 90-degree phase difference between two channels of output first sub-signals.

By using the first preset value and the second preset value, a vertical direction of a beam combined by the at least two first antenna arrays 71 and the at least two second antenna arrays 72 that are driven only by the radio frequency channel 30 and the radio frequency channel 50 (after some radio frequency channels are disabled) is the same as a vertical direction of a beam combined by each first antenna array 71 and each second antenna array 72 that are each driven by one radio frequency channel (before the radio frequency channels are disabled). Therefore, before and after the radio frequency channels are disabled, a cell is not changed, thereby avoiding a handover or re-access of UE, and ensuring user experience.

Referring to FIG. 5, specifically, one of the at least two first output ends 42 is a first port 421, and another of the at least two first output ends 42 is a second port 422. The first channel of first sub-signal is output from the first port 421, and the second channel of first sub-signal is output from the second port 422. The first port 421 is connected to a first channel of first phase shifter 91, and the first channel of first phase shifter 91 is configured to adjust the first channel of first sub-signal, so that the phase difference between the first channel of first sub-signal and the second channel of first sub-signal reaches the first preset value; and/or the second port 422 is connected to a second channel of first phase shifter 92, and the second channel of first phase shifter 92 is configured to adjust the second channel of first sub-signal, so that the phase difference between the first channel of first sub-signal and the second channel of first sub-signal reaches the first preset value.

To be specific, the first port 421 and the second port 422 may be respectively provided with the phase shifter 91 and the phase shifter 92. The phase shifter 91 performs phase adjustment on the first channel of first sub-signal, and the phase shifter 92 performs phase adjustment on the second channel of first sub-signal, so that the phase difference between the first channel of first sub-signal and the second channel of first sub-signal reaches the first preset value. Alternatively, only the first port 421 may be provided with the phase shifter 91, the phase shifter 91 performs phase adjustment on the first channel of first sub-signal, and phase adjustment is not performed on the second channel of first sub-signal, so that the phase difference between the first channel of first sub-signal and the second channel of first sub-signal reaches the first preset value. Alternatively, only the second port 422 may be provided with the phase shifter 92, the phase shifter 92 performs phase adjustment on the second channel of first sub-signal, and phase adjustment is not performed on the first channel of first sub-signal, so that the phase difference between the first channel of first sub-signal and the second channel of first sub-signal reaches the first preset value. In summary, to adjust the phase difference between the two channels of first sub-signals, the two channels of first sub-signals may be adjusted by using respective phase shifters, or only one channel of first sub-signal may be adjusted by using a phase shifter.

Similarly, one of the at least two second output ends 62 is a third port 621, and another of the at least two second output ends 62 is a fourth port 622. The first channel of second sub-signal is output from the third port 621, and the second channel of second sub-signal is output from the fourth port 622. The third port 621 is connected to a first channel of second phase shifter 93, and the first channel of second phase shifter 93 is configured to adjust the first channel of second sub-signal, so that the phase difference between the first channel of second sub-signal and the second channel of second sub-signal reaches the first preset value; and/or the fourth port 622 is connected to a second channel of second phase shifter 94, and the second channel of second phase shifter 94 is configured to adjust the second channel of second sub-signal, so that the phase difference between the first channel of second sub-signal and the second channel of second sub-signal reaches the second preset value.

To be specific, the third port 621 and the fourth port 622 may be respectively provided with the phase shifter 93 and the phase shifter 94. The phase shifter 93 performs phase adjustment on the first channel of second sub-signal, and the phase shifter 94 performs phase adjustment on the second channel of second sub-signal, so that the phase difference between the first channel of second sub-signal and the second channel of second sub-signal reaches the second preset value. Alternatively, only the third port 621 may be provided with the phase shifter 93, the phase shifter 93 performs phase adjustment on the first channel of second sub-signal, and phase adjustment is not performed on the second channel of second sub-signal, so that the phase difference between the first channel of second sub-signal and the second channel of second sub-signal reaches the second preset value. Alternatively, only the fourth port 622 may be provided with the phase shifter 94, the phase shifter 94 performs phase adjustment on the second channel of second sub-signal, and phase adjustment is not performed on the first channel of second sub-signal, so that the phase difference between the first channel of second sub-signal and the second channel of second sub-signal reaches the second preset value. In summary, to adjust the phase difference between the two channels of second sub-signals, the two channels of second sub-signals may be adjusted by using respective phase shifters, or only one channel of second sub-signal may be adjusted by using a phase shifter.

In an implementation, the first preset value is the same as the second preset value. Specifically, the following two cases may be included:

(1) A phase difference between each of the at least two channels of first sub-signals and the first channel of first sub-signal is the same, and is the first preset value; a phase difference between each of the at least two channels of second sub-signals and the first channel of second sub-signal is the same, and is the second preset value; and the first preset value is the same as the second preset value. For example, the phase difference between the first channel of first sub-signal and each of other channels of first sub-signal is 90 degrees, and the phase difference between the first channel of second sub-signal and each of other channels of second sub-signals is also 90 degrees.

(2) There is a phase difference between each of the at least two first sub-signals and the first channel of first sub-signal, but the phase differences are different; there is a phase difference between each of the at least two second sub-signals and the first channel of second sub-signal, but the phase differences are different; but a set of the phase differences between each of the at least two first sub-signals and the first channel of first sub-signal is the same as a set of the phase differences between each of the at least two second sub-signals and the first channel of second sub-signal. For example, the phase differences between the first channel of first sub-signal and other channels of first sub-signals are respectively 90 degrees, 180 degrees, 270 degrees . . . ; and the phase differences between the first channel of second sub-signal and other channels of second sub-signals are also respectively 90 degrees, 180 degrees, 270 degrees . . . .

Because the first channel of first sub-signal and the first channel of second sub-signal have the same phases, the first preset value is the same as the second preset value, so that a set of phases of the other channels of first sub-signals and a set of phases of the other channels of second sub-signals are the same, that is, a plurality of channels of first sub-signals and a plurality of channels of second sub-signals are correspondingly the same. For example, phases of the first channel of first sub-signal and the first channel of second sub-signal are both 0 degree, the phases of the other channels of first sub-signals are 90 degrees, 180 degrees, 270 degrees . . . , and the phases of the other channels of second sub-signals are 90 degrees, 180 degrees, 270 degrees . . . . In this way, regularity and stability of the system 10 can be improved, and a vertical direction of a beam combined by the plurality of first antenna arrays and the plurality of second antenna arrays is better controlled to be the same as that before the radio frequency channels are disabled, so that a cell is not changed before and after the radio frequency channels are disabled, thereby avoiding a handover or re-access of UE, and ensuring user experience.

The foregoing phase shifter may be a fixed phase shifter or a tunable phase shifter, and may be an independent electronic component, or may be integrated with another element, for example, may be a phase shift unit integrated in a coupler or integrated in an analog bridge. However, adjusting the phase difference is not limited to using the phase shifter. This embodiment of this application may alternatively be implemented in another manner. For example, output ports of analog bridges may have a phase difference, that is, a phase difference between at least one first output end and at least one second output end is implemented by using a circuit architecture in the bridges.

As shown in FIG. 5, in an implementation, the first input end 41 is connected to a first power amplifier 411, and the first power amplifier 411 is configured to amplify the first signal; and the second input end 61 is connected to a second power amplifier 611, and the second power amplifier 611 is configured to amplify the second signal. The first power amplifier 411 may be disposed in the first radio frequency channel 30, or may be disposed between the first radio frequency channel 30 and the first analog bridge 40. A power amplifier is configured to amplify power of a radio frequency signal, to improve signal strength.

In an implementation, the first analog bridge 40 and/or the second analog bridge 60 are/is a single analog bridge or a group of analog bridges. This implementation includes three cases. First: The first analog bridge 40 is a single analog bridge or a group of analog bridges. Second: The second analog bridge 60 is a single analog bridge or a group of analog bridges. Third: Each of the first analog bridge 40 and the second analog bridge 60 is a single analog bridge or a group of analog bridges.

It should be noted that, for ease of description, in FIG. 4 and FIG. 5, descriptions are made by using an example in which there are two radio frequency channels and the bridge unit 103 includes two analog bridges. During implementation, there may be one, two, or more radio frequency channels, and the bridge unit 103 may include one analog bridge or at least two analog bridges. When the bridge unit 103 includes at least two analog bridges, any one of a plurality of channels of signals output by each analog bridge is coupled back to the phase correction unit 20, and the phase correction unit 20 adjusts one or more of signals at output ends corresponding to the at least two analog bridges, so that phases of corresponding channels of signals in a plurality of channels of signals at the output ends of the at least two analog bridges are the same. In addition, one or more output ends of each of the at least two analog bridges are provided with phase shifters, so that sets of phases of signals at the output ends of the analog bridges are all the same. In this way, a vertical direction of a beam combined by antenna arrays corresponding to all radio frequency channels is finally the same as a vertical direction of a beam combined by the antenna arrays before radio frequency channels are disabled, so that a cell is not changed before and after the radio frequency channels are disabled.

When the bridge unit 103 has only one analog bridge, the radio frequency apparatus 101 may not include the phase correction unit 20, and one or more output ends of the one analog bridge are provided with phase shifters, so that a plurality of channels of signals output by the one analog bridge have a preset phase difference.

Figure 6:
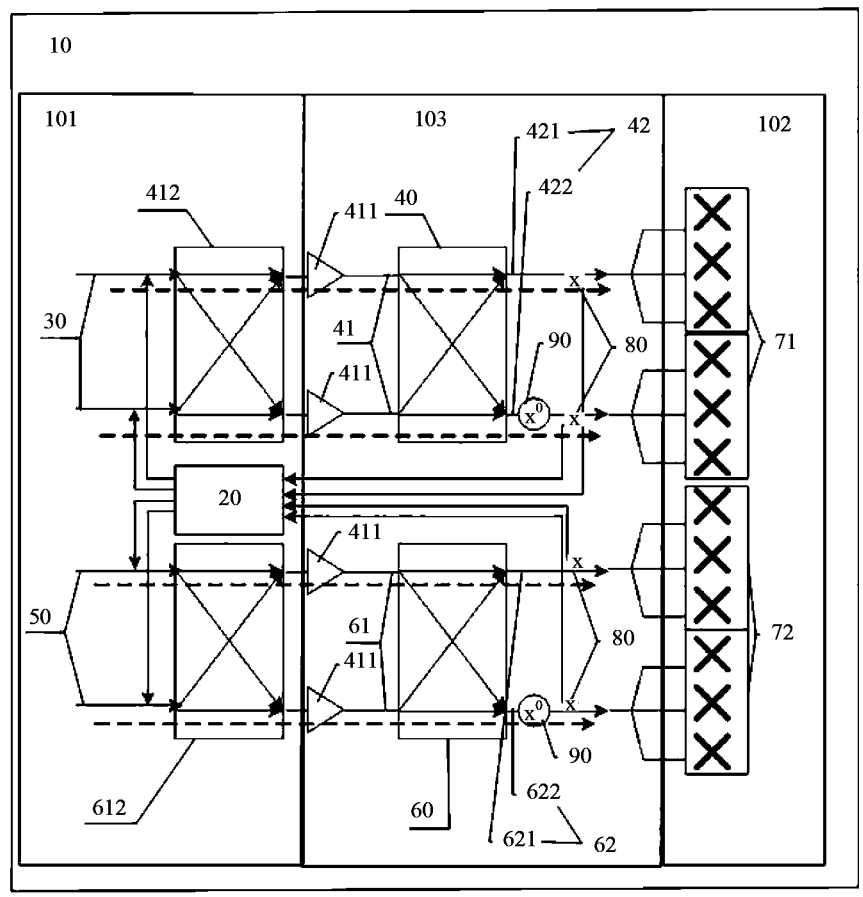
FIG. 6 is a schematic diagram of a system according to an implementation of this application.

FIG. 6 is a schematic diagram of a system 10 in an implementation.

In the system 10 in FIG. 6, the design of the analog bridge in FIG. 4 or FIG. 5 is used. When a capacity requirement of the system 10 is relatively large, all radio frequency channels need to be enabled, so that all the radio frequency channels and antenna arrays have a one-to-one correspondence, and a relatively large amount of information can be sent or received. Due to performance of the analog bridge, a signal input from an input end of the analog bridge is divided into at least two channels of signals that are respectively output from output ends of the analog bridge, failing to form a one-to-one correspondence with an antenna array. In the system 10 shown in FIG. 6, the radio frequency channels and the antenna arrays can still maintain the one-to-one correspondence when the analog bridge is introduced.

It should be noted that, in this implementation, descriptions are made by using an example of an architecture including four radio frequency channels, two analog bridges each with two inputs and two outputs, and four antenna arrays. In actual application, a quantity of radio frequency channels, a sum of quantities of input ends and a sum of quantities of output ends of analog bridges in a bridge apparatus, and a quantity of antenna arrays are the same. There may be one or more radio frequency channels and antenna arrays, for example, one, two, three, or more radio frequency channels and antenna arrays. There may be one or more analog bridges, for example, one, two, three, or more analog bridges. This is not limited in this embodiment of this application.

A radio frequency apparatus 101 shown in FIG. 6 includes two first radio frequency channels 30, two second radio frequency channels 50, a signal processing unit 412, a signal processing unit 612, and a phase correction unit 20.

A bridge apparatus 103 shown in FIG. 6 includes a first analog bridge 40 and a second analog bridge 60. The first analog bridge 40 includes two first input ends 41 and two first output ends 42, and the two first output ends 42 are a first port 421 and a second port 422. The second analog bridge 60 includes two second input ends 61 and two second output ends 62, and the two second output ends 62 are a signal of a third port 621 and a fourth port 622. The bridge apparatus 103 further includes an amplifier, a coupler, and a phase shifter. All of the two first input ends 41 and the two second input ends 61 are provided with power amplifiers 411. Both the two first output ends 42 and the two second output ends 62 are provided with couplers 80.

An antenna apparatus shown in FIG. 6 includes two first antenna arrays 71 and two second antenna arrays 72.

It should be noted that an apparatus or a component that is shown in FIG. 6 and that has the same reference sign as that in FIG. 4 or FIG. 5 may implement a function that is the same as or similar to that in FIG. 4 or FIG. 5.

In this implementation, each analog bridge includes two input ends and two output ends. The four radio frequency channels respectively drive the four antenna arrays, and implement one-to-one driving by using four channels of independent signal branches. As shown in FIG. 6, directions indicated by dashed lines with arrows are signal flow directions, including four nearly parallel dashed lines. Specifically, the first radio frequency channels 30, the first input ends 41, and the first output ends 42 are connected in a one-to-one correspondence, thereby forming two parallel first signal branches. When both the second radio frequency channels 50 are enabled, the second radio frequency channels 50, the second input ends 61, and the second output ends 62 are connected in a one-to-one correspondence, thereby forming two parallel second signal branches.

When both the first radio frequency channels are enabled, the signal processing unit 412 performs pre-weighting processing on signals of both the first radio frequency channels 30, so that the signals of the two first radio frequency channels 30 are respectively transmitted from the two parallel first signal branches to different first antenna arrays 71. When both the second radio frequency channels 50 are enabled, the signal processing unit 612 performs pre-weighting processing on signals of both the second radio frequency channels 50, so that the signals of the two second radio frequency channels 50 are respectively transmitted from the two parallel second signal branches to different second antenna arrays 72. The signal processing units 412 and 612 may be implemented by using software, or may be a hardware circuit architecture.

In an implementation, the signal processing units 412 and 612 perform pre-weighting processing on the signals of the first radio frequency channels 30 and the signals of the second radio frequency channels 50 by using inverse compensation bridges, the inverse compensation bridges of the signal processing units 412 and 612 are respectively inverse matrices of the first analog bridge 40 and the second analog bridge 60. For example, in an implementation, an algorithm of an inverse compensation bridge is as follows:

A matrix of the first analog bridge 40 is:

$$\frac{1}{\sqrt{2}}\begin{bmatrix} 1 & -j \\ -j & 1 \end{bmatrix},$$

where j is a complex number.

A matrix of a signal of the inverse compensation bridge is an inverse matrix of the first analog bridge 40:

$$\begin{bmatrix} \frac{1}{\sqrt{2}} & \frac{j}{\sqrt{2}} \\ \frac{j}{\sqrt{2}} & \frac{1}{\sqrt{2}} \end{bmatrix}$$

Before being pre-weighted by using the inverse compensation bridge, one channel of signal in output signals of the first analog bridge 40 is represented as:

$$\begin{bmatrix} X^0 \\ X^1 \end{bmatrix}.$$

After being pre-weighted by using the inverse compensation bridge, an input signal of the first radio frequency channel 30, that is, an input signal corresponding to the one channel of output signal of the first analog bridge 40, is:

$$\begin{bmatrix} Y^0 \\ Y^1 \end{bmatrix} = \frac{1}{\sqrt{2}}\begin{bmatrix} 1 & -j \\ -j & 1 \end{bmatrix}\begin{bmatrix} \frac{1}{\sqrt{2}} & \frac{j}{\sqrt{2}} \\ \frac{j}{\sqrt{2}} & \frac{1}{\sqrt{2}} \end{bmatrix}\begin{bmatrix} X^0 \\ X^1 \end{bmatrix}$$

$$= \begin{bmatrix} X^0 \\ X^1 \end{bmatrix}$$

It can be learned that, after being pre-weighted by using the inverse compensation bridge, the signal input by the radio frequency channel in each signal branch is consistent with the signal output by the analog bridge, thereby implementing consistency between a signal at an input end and a signal at an output end of each signal branch.

It should be noted that, during implementation, matrices of the first analog bridge 40 and the second analog bridge 60 may be in other forms than those in the foregoing example. This is not limited in this embodiment of this application.

The phase correction unit 20 may refer to a signal coupled back by the first port 421 and the third port 621, or the phase correction unit 20 may refer to a signal coupled back by the second port 422 and the fourth port 622. The first port, the second port, the third port, and the fourth port may all be connected to the phase correction unit 20. With reference to phases of signals of the first port, the second port, the third port, and the fourth port, the phase correction unit 20 adjusts the signals input into the two first radio frequency channels 30 and the signals input into the two second radio frequency channels 50, and sends adjusted signals to corresponding radio frequency channels (that is, the two first radio frequency channels 30 and the two second radio frequency channels 50). After the adjustment, phases of signals output by the first port, the second port, the third port, and the fourth port are aligned. In this implementation, the phase correction unit 20 may perform phase adjustment on the signals input into the radio frequency channels with reference to all signals of the first port, the second port, the third port, and the fourth port, so that the phases of the signals of the four ports are aligned with a unified phase value. Alternatively, phase adjustment may be performed on the signals input into the radio frequency channels with reference to signals of only three ports of the first port, the second port, the third port, and the fourth port, so that phases of the signals of the three referred ports are aligned based on a phase value of another port.

Details of signal correction performed by the phase correction unit 20 may be consistent with the implementation shown in FIG. 4, and details are not described again.

Figure 7:
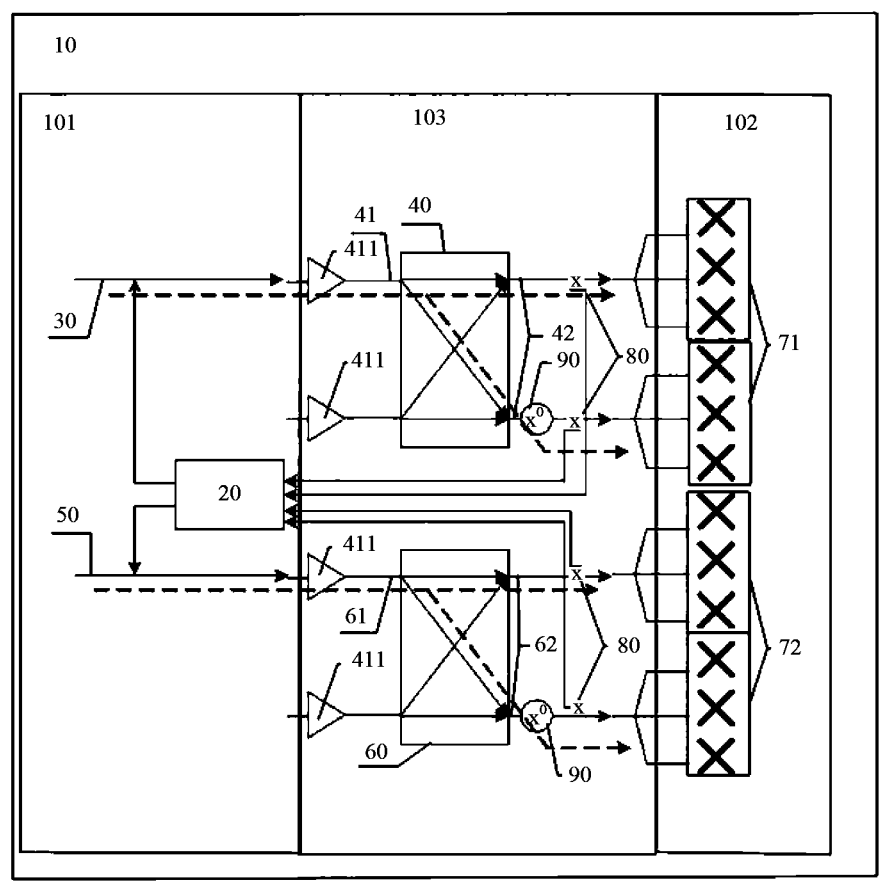
FIG. 7 is a schematic diagram of a system according to an implementation of this application.

FIG. 7 is a schematic diagram of a system 10 according to another embodiment of this application.

A difference between this implementation and the implementation shown in FIG. 6 is that, in this implementation, a communications apparatus disables two radio frequency channels, that is, there is one first radio frequency channel 30 and one second radio frequency channel 50. Correspondingly, there is also one first input end 41 of the first analog bridge 40 and one second input end 61 of the second analog bridge 60, but output ends of the first analog bridge 40 and the second analog bridge 60 are not closed, that is, there are still two first output ends 42 and two second output ends 62. The antenna array is not turned off either, that is, there are still two first antenna arrays 711 and two second antenna arrays 72. In this implementation, one channel of input signal drives two antenna arrays. As shown in FIG. 7, directions indicated by dashed lines with arrows are signal flow directions. Energy can be saved by disabling two radio frequency channels. However, in this implementation, signal transmission is performed still by using four antenna arrays (the two first antenna arrays 711 and the two second antenna arrays 72), and coverage performance of the antenna system is not significantly degraded.

In this implementation, by using the first analog bridge 40 and the second analog bridge 60, signals of the first radio frequency channel 30 and signals of the second radio frequency channel 50 are divided into two first sub-signals and two second sub-signals respectively after passing through a first analog bridge 40 and the second analog bridge 60 respectively. In addition, the phase correction unit 20 adjusts a phase of a signal, so that the two first sub-signals respectively drive the two first antenna arrays 71, and the two second sub-signals respectively drive the two second antenna arrays 72. In this way, a signal of a radio frequency channel may be divided into at least two channels of signals and can be sent to at least two antenna arrays. In this way, a relatively small quantity of radio frequency channels can be used to drive a relatively large quantity of driving antenna arrays, thereby reducing power consumption of the system 10 and saving energy.

In this implementation, both the two first output ends 42 and the two second output ends 62 are provided with couplers 80, that is, the communications apparatus includes four couplers 80. Signals output by the two first output ends 42 and signals output by the two second output ends 62 all pass through the couplers 80 and are then transmitted to the first antenna arrays 71 and the second antenna arrays 72 respectively. The communications apparatus further includes two phase shifters 90 that are respectively disposed at one of the first output ends 42 and one of the second output ends 62. The phase shifters 90 are configured to change a phase of a signal, so that a phase difference between the signals of the two first output ends 42 is a first preset value, and a phase difference between the signals of the two second output ends 62 is a second preset value. The first preset value and the second preset value may be equal.

In FIG. 6 and FIG. 7, an analog bridge with two inputs and two outputs is used as an example. During implementation, the analog bridge may have N inputs and M outputs, where M is greater than or equal to N. The analog bridge may be a single bridge or a group of analog bridges. A structure of a group of analog bridges is shown below.

Figure 8:
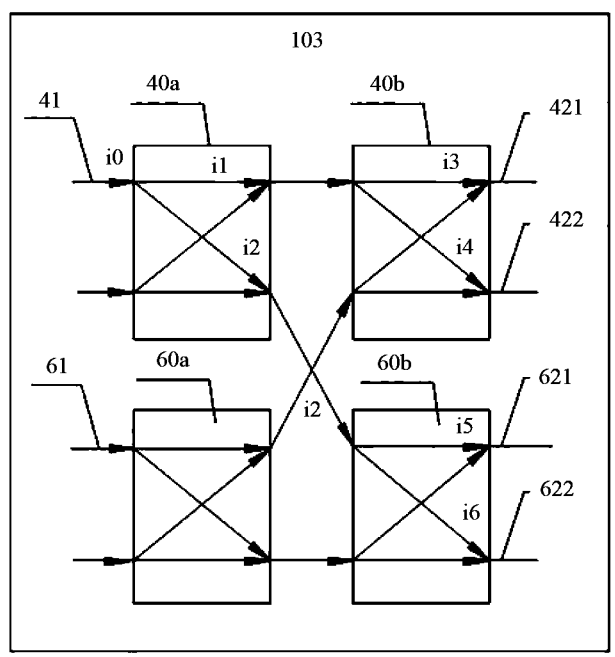
FIG. 8 is a schematic diagram of a group of analog bridges according to an implementation of this application.

Referring to FIG. 8, a group of analog bridges 103 includes four bridges: a first bridge 40a, a second bridge 40b, a second bridge 60a, and a fourth bridge 60b respectively. A signal i0 input from an input end 41 of the first bridge 40a, after entering the first bridge 40a, is divided into two channels of signals i1 and i2. The first channel of signal i1 is output from the first bridge 40a and enters the second bridge 40b from an input end of the second bridge 40b. The first channel of signal i1 is divided into two channels of signals i3 and i4 in the second bridge 40b. Therefore, a first output end 421 of the second bridge 40b outputs the signal i3, and a second output end 422 of the second bridge 40b outputs the signal i4. The second channel of signal i2 is output from the first bridge 40a and enters the fourth bridge 60b from an input end of the fourth bridge 60b. The second channel of signal i2 is divided into two channels of signals i5 and i6 in the fourth bridge 60b. Therefore, a first output end 621 of the fourth bridge 60b outputs the signal i5, and a second output end 622 of the fourth bridge 60b outputs the signal i6. In this way, the signal i0 input from the group of analog bridges 103 may be divided into four output signals i3, i4, i5, and i6.

With reference to the description of any one of FIG. 4 to FIG. 8, the embodiments of this application provide the following communications apparatuses.

An embodiment of this application provides a communications apparatus. The communications apparatus includes a radio frequency apparatus 101 and a bridge unit 103. The communications apparatus may be an RRU, an RFU, or another apparatus that can complete conversion between a digital signal or an intermediate frequency signal and a radio frequency signal.

An embodiment of this application provides a communications apparatus. The communications apparatus includes an antenna apparatus 102 and a bridge unit 103. The communications apparatus may be an antenna or another apparatus that can transmit a radio frequency signal to the air or receive an external radio frequency signal.

An embodiment of this application provides a communications apparatus. The communications apparatus includes a radio frequency apparatus 101, a bridge unit 103, and an antenna apparatus 102. The communications apparatus may be an AAU or another apparatus that can convert a digital signal or an intermediate frequency signal into a radio frequency signal and transmit the radio frequency signal to the air.

In this specification, it should be noted that:

Terms "first", "second", and the like in this application are merely used to distinguish between different objects, and "first" and "second" do not limit an actual sequence or functions of the objects modified by "first" and "second". For example, "first" and "second" in the "first antenna array" and the "second antenna array" are merely used to indicate that the two respectively correspond to the first radio frequency channel and the second radio frequency channel, and an actual sequence or functions are not limited by "first" and "second".

Expressions "as an example", "in an example", "for example", "an optional design", or "a design" used in this application are merely used to provide an example, illustration, or description. Any embodiment or design scheme described as "example", "for example", "such as", "optional design", or "a design" in this application should not be construed as being more preferred or more advantageous than another embodiment or another design scheme. To be specific, these terms are used to present a related concept in a specific manner. The term "and/or" in this application describes merely an association relationship for describing associated objects and represents that three relationships may exist. For example, A and/or B may represent the following three cases: Only A exists, both A and B exist, and only B exists. In addition, the character "/" in this application generally indicates an "or" relationship between objects before and after the character "/", unless otherwise specified.

A term "plurality" in this application may indicate two, three, or more, and "more than" and "less than" include the modified number.

Various objects that may appear such as various devices/network elements/systems/apparatuses/signals/operations/components are named in this application. However, these specific names do not constitute a limitation to related objects. The names may be changed with factors such as scenarios, context, or use habits. Understanding of technical meanings of the technical terms in this application should be mainly determined based on functions and technical effects embodied/performed by the related objects in the technical solutions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications apparatus, comprising a phase correction unit, a first radio frequency channel, a first analog bridge, a second radio frequency channel, and a second analog bridge, wherein
the first analog bridge comprises a first input end and at least two first output ends, the first input end is connected to the first radio frequency channel, and each first output end is connected to one first antenna array;
the second analog bridge comprises a second input end and at least two second output ends, the second input end is connected to the second radio frequency channel, and each second output end is connected to one second antenna array;
a first signal is sent to the first input end by using the first radio frequency channel, and is divided into at least two channels of first sub-signals by using the first analog bridge, and the at least two channels of first sub-signals are respectively output from the at least two first output ends to at least two first antenna arrays;
a second signal is sent to the second input end by using the second radio frequency channel, and is divided into at least two channels of second sub-signals by using the second analog bridge, and the at least two channels of second sub-signals are respectively output from the at least two second output ends to at least two second antenna arrays; and
a first channel of first sub-signal in the at least two channels of first sub-signals and a first channel of second sub-signal in the at least two channels of second sub-signals are separately coupled to the phase correction unit by using a coupler, and the phase correction unit sends an adjusted signal to a corresponding radio frequency channel, so that a phase of the first channel of first sub-signal is the same as a phase of the first channel of second sub-signal.

2. The communications apparatus according to claim 1, wherein the communications apparatus further comprises:
an antenna unit, wherein the antenna unit comprises the at least two first antenna arrays and the at least two second antenna arrays.

3. The communications apparatus according to claim 1, wherein that the phase correction unit sends an adjusted signal to a corresponding radio frequency channel comprises:
adjusting, by the phase correction unit, the first signal, and sending an adjusted first signal to the first radio frequency channel; or
adjusting, by the phase correction unit, the second signal, and sending an adjusted second signal to the second radio frequency channel; or
adjusting, by the phase correction unit, the first signal and the second signal, sending an adjusted first signal to the first radio frequency channel, and sending an adjusted second signal to the second radio frequency channel.

4. The communications apparatus according to claim 1, wherein a phase difference between the first channel of first sub-signal and a second channel of first sub-signal in the at least two channels of first sub-signals is a first preset value; and
a phase difference between the first channel of second sub-signal and a second channel of second sub-signal in the at least two channels of second sub-signals is a second preset value.

5. The communications apparatus according to claim 4, wherein
one of the at least two first output ends is a first port, another one of the at least two first output ends is a second port, the first channel of first sub-signal is output from the first port, and the second channel of first sub-signal is output from the second port;
the first port is connected to a first channel of first phase shifter, and the first channel of first phase shifter is configured to adjust the first channel of first sub-signal, so that the phase difference between the first channel of first sub-signal and the second channel of first sub-signal reaches the first preset value; and/or the second port is connected to a second channel of first phase shifter, and the second channel of first phase shifter is configured to adjust the second channel of first sub-signal, so that the phase difference between the first channel of first sub-signal and the second channel of first sub-signal reaches the first preset value.

6. The communications apparatus according to claim 5, wherein
one of the at least two second output ends is a third port, another one of the at least two second output ends is a fourth port, the first channel of second sub-signal is output from the third port, and the second channel of second sub-signal is output from the fourth port;
the third port is connected to a first channel of second phase shifter, and the first channel of second phase shifter is configured to adjust the first channel of second sub-signal, so that the phase difference between the first channel of second sub-signal and the second channel of second sub-signal reaches the first preset value; and/or
the fourth port is connected to a second channel of second phase shifter, and the second channel of second phase shifter is configured to adjust the second channel of second sub-signal, so that the phase difference between the first channel of second sub-signal and the second channel of second sub-signal reaches the second preset value.

7. The communications apparatus according to claim 4, wherein the first preset value is the same as the second preset value.

8. The communications apparatus according to claim 1, wherein the first input end is connected to a first power amplifier, the first power amplifier is configured to amplify the first signal, the second input end is connected to a second power amplifier, and the second power amplifier is configured to amplify the second signal.

9. The communications apparatus according to claim 1, wherein the first analog bridge and/or the second analog bridge are/is a single analog bridge or a group of analog bridges.

10. A communications apparatus, comprising an antenna unit, a phase correction unit, a first analog bridge, and a second analog bridge, wherein
the antenna unit comprises at least two first antenna arrays and at least two second antenna arrays;
the first analog bridge comprises a first input end and at least two first output ends, the first input end is connected to a first radio frequency channel, and each first output end is connected to one first antenna array;
the second analog bridge comprises a second input end and at least two second output ends, the second input end is connected to a second radio frequency channel, and each second output end is connected to one second antenna array;
a first signal is sent to the first input end by using the first radio frequency channel, and is divided into at least two channels of first sub-signals by using the first analog bridge, and the at least two channels of first sub-signals are respectively output from the at least two first output ends to the at least two first antenna arrays;
a second signal is sent to the second input end by using the second radio frequency channel, and is divided into at least two channels of second sub-signals by using the second analog bridge, and the at least two channels of second sub-signals are respectively output from the at least two second output ends to the at least two second antenna arrays; and
a first channel of first sub-signal in the at least two channels of first sub-signals and a first channel of second sub-signal in the at least two channels of second sub-signals are coupled to the phase correction unit by using a coupler, and the phase correction unit sends an adjusted signal to a corresponding radio frequency channel, so that a phase of the first channel of first sub-signal is the same as a phase of the first channel of second sub-signal.

* * * * *